US010120791B2

(12) United States Patent
Yamada

(10) Patent No.: US 10,120,791 B2
(45) Date of Patent: Nov. 6, 2018

(54) DATA READ APPARATUS, DATA READ METHOD, AND STORAGE MEDIUM STORING DATA READ PROGRAM

(71) Applicant: CASIO COMPUTER CO., LTD., Tokyo (JP)

(72) Inventor: Shunsuke Yamada, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 208 days.

(21) Appl. No.: 14/855,628

(22) Filed: Sep. 16, 2015

(65) Prior Publication Data
US 2016/0085456 A1 Mar. 24, 2016

(30) Foreign Application Priority Data

Sep. 18, 2014 (JP) ................................ 2014-189977

(51) Int. Cl.
*G06F 3/06* (2006.01)
*G06F 1/28* (2006.01)
(Continued)

(52) U.S. Cl.
CPC .......... *G06F 12/00* (2013.01); *G06F 12/0246* (2013.01); *G06F 2212/7207* (2013.01); *Y02D 10/13* (2018.01)

(58) Field of Classification Search
CPC ................ G06F 12/00; G06F 12/0246; G06F 2212/72075; Y02B 60/1225; Y02B 60/122
See application file for complete search history.

(56) References Cited

U.S. PATENT DOCUMENTS

| 6,128,695 A * | 10/2000 | Estakhri ................. G06F 3/061 711/103 |
| 6,813,678 B1 * | 11/2004 | Sinclair ................. G06F 3/0626 711/103 |
| 2008/0071723 A1 * | 3/2008 | Joshi ................. G06F 17/30067 |

FOREIGN PATENT DOCUMENTS

| JP | H7-295866 A | 11/1995 |
| JP | H9-97206 A | 4/1997 |

(Continued)

OTHER PUBLICATIONS

Office Action dated Oct. 18, 2016 for Japanese Patent Application No. 2014-189977 and English translation of the same. (4 pages).

*Primary Examiner* — Reginald Bragdon
*Assistant Examiner* — Mehdi Namazi
(74) *Attorney, Agent, or Firm* — Fitch, Even, Tabin & Flannery LLP

(57) ABSTRACT

A data read apparatus includes a nonvolatile memory comprising a plurality of blocks, each of the blocks including an area storing block information, in which a position of a next block is written, or storing the block information and file management information, and an area storing actual data; a volatile memory; a power-on circuit configured to turn on supply of power to the nonvolatile memory and the volatile memory; and a processor. The processor is configured to: read out the block information stored in each of the blocks of the nonvolatile memory, or the block information and the file management information, when the supply of power was turned on by the power-on circuit, and register the read-out block information, or the block information and the file management information, in the volatile memory as file position information.

6 Claims, 15 Drawing Sheets

(51) Int. Cl.
  *G06F 12/00* (2006.01)
  *G06F 12/02* (2006.01)

(56) References Cited

FOREIGN PATENT DOCUMENTS

| | | |
|---|---|---|
| JP | 2000-276402 A | 10/2000 |
| JP | 2006-252535 A | 9/2006 |
| JP | 2008-59228 A | 3/2008 |

\* cited by examiner

| INFORMATION | DATA LENGTH [byte] | CONTENT |
|---|---|---|
| SECTOR STATE | 1 | IN USE OR UNUSED |
| SECTOR LOGIC DELETE FLAG | 1 | WHETHER LOGIC WAS DELETED OR NOT |
| DATA INFORMATION | 1 | METADATA (WITH FILE MANAGEMENT INFORMATION)/ NORMAL DATA (WITHOUT FILE MANAGEMENT INFORMATION) |
| NEXT SECTOR NUMBER | 2 | SECTOR NUMBER ("FFFF" INDICATES TERMINAL END) |

FIG.5
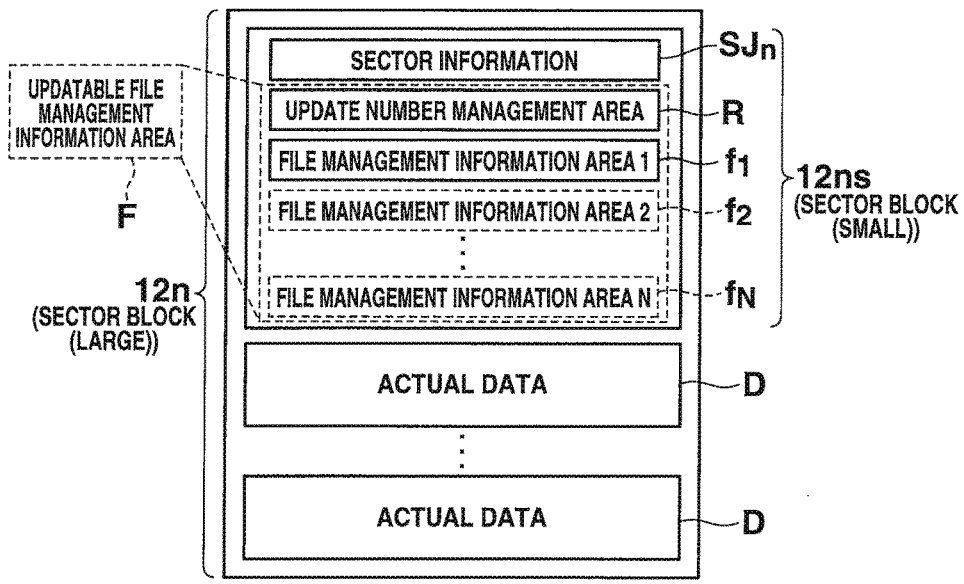
FIG.6A
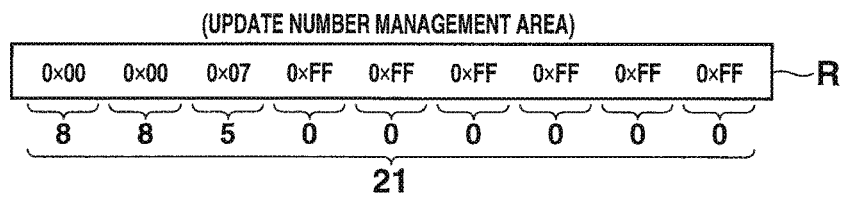
FIG.6B
| MANAGEMENT AREA VALUE | UPDATE NUMBER |
|---|---|
| 0×FF | 0 |
| 0×7F | 1 |
| 0×3F | 2 |
| 0×1F | 3 |
| 0×0F | 4 |
| 0×07 | 5 |
| 0×03 | 6 |
| 0×01 | 7 |
| 0×00 | 8 |

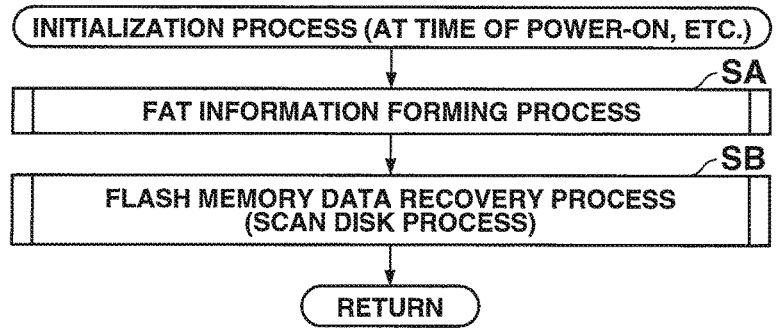
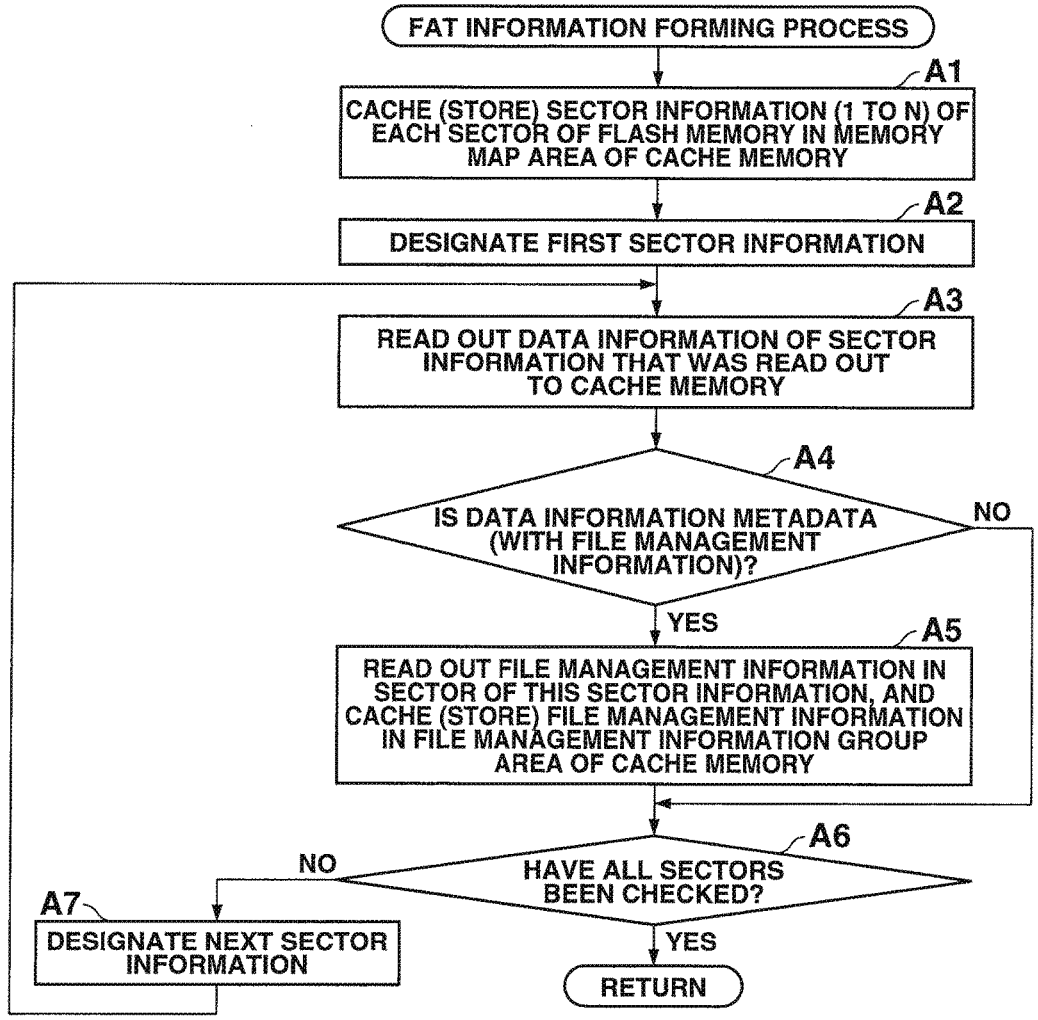

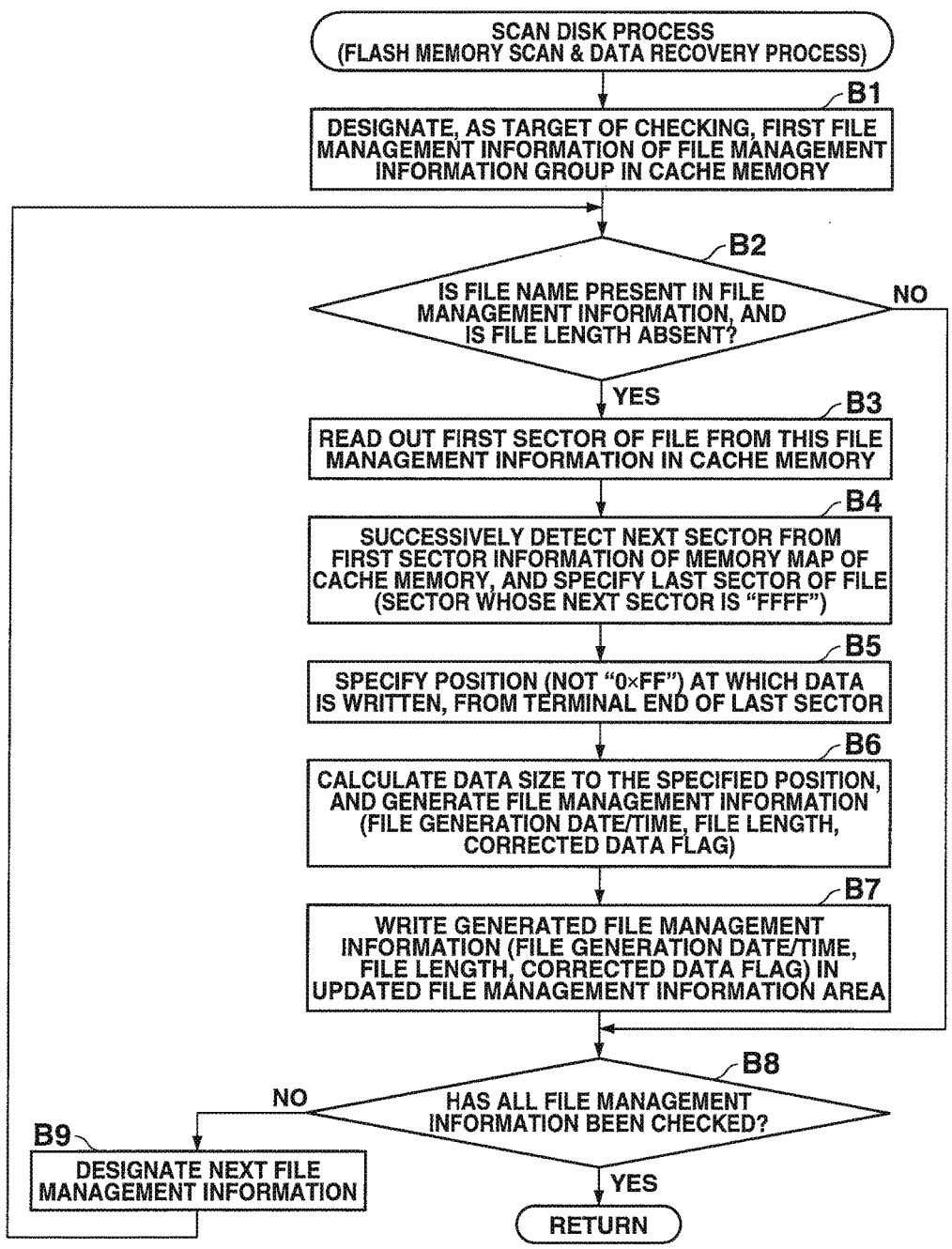

DATA READ APPARATUS, DATA READ METHOD, AND STORAGE MEDIUM STORING DATA READ PROGRAM

CROSS-REFERENCE TO RELATED APPLICATIONS

This application is based upon and claims the benefit of priority from Japanese Patent Application No. 2014-189977, filed Sep. 18, 2014, the entire contents of which are incorporated herein by reference.

BACKGROUND OF THE INVENTION

1. Field of the Invention

The present invention relates generally to a data read apparatus for reading out data which is stored in a nonvolatile memory, a data read method, and a storage medium storing a data read program.

2. Description of the Related Art

In general, a flash memory, which is a nonvolatile memory, is used as a memory of an electronic device such as a mobile terminal. FAT (File Allocation Table) information is necessary for exactly accessing data of a file stored in this flash memory.

For example, methods (1) and (2) to be described below are thought as methods of managing data of the flash memory.

(1) A flash ROM management method is thought (see, for example, Jpn. Pat. Appln. KOKAI Publication No. 2000-276402). In this method, read/write of data is managed by forming, with respect to each of sectors which are formed as blocks in a flash memory, a storage area of management information such as a logical sector number corresponding to a storage position of each file in the sector, and information indicating, for example, that the sector is in use or unused. Thereby, a data read/write unit in the flash memory can be managed by making the data read/write unit smaller than a data erase unit.

(2) A flash memory driving method is thought (see, for example, Jpn. Pat. Appln. KOKAI Publication No. H09-097206). In this method, a cache memory is provided at a front stage of a flash memory. The cache memory has a capacity for one sector that is formed as a block in the flash memory. By executing write/read access to the sector which is entered in this cache memory, the substantial number of times of write of the flash memory can be reduced. In the meantime, if a target sector of write/read is not entered in the cache memory, read is directly executed on the flash memory, and write is executed on the cache memory after entering this sector in the cache memory.

Technical Problem

In the above-described (1) flash ROM management method, when a file is deleted or updated, in order to update the management information of the file, it is necessary to rewrite the entirety of one block of the sector in which the storage area of the management information is formed. Thus, the number of times of read, erase and write of the sector and access to the flash memory increases, leading to a considerable decrease in processing speed.

In the above-described (2) flash memory driving method, each time the target sector of write/read becomes different, it is necessary to execute re-entry of the sector from the cache memory to the flash memory, and entry of another sector from the flash memory to the cache memory. Like the above-described (1), the number of times of access to the flash memory increases, leading to a considerable decrease in processing speed.

On the other hand, it is thought to form, in the first sector of the flash memory, FAT information of all the other sectors. However, the number of times of access/write to this sector increases considerably in all cases, such as read, write, update, delete, etc. of files, and, owing to this, the processing speed decreases considerably, like the case as described above.

BRIEF SUMMARY OF THE INVENTION

The present invention has been made in consideration of the above problems, and the object of the invention is to provide a data read apparatus which can quickly execute data read from a nonvolatile memory, and a control program thereof.

Solution to Problem

In general, according to one embodiment, a data read apparatus includes a nonvolatile memory comprising a plurality of blocks, each of the blocks including an area storing block information, in which a position of a next block is written, or storing the block information and file management information, and an area storing actual data; a volatile memory; a power-on circuit configured to turn on supply of power to the nonvolatile memory and the volatile memory; and a processor. The processor is configured to: (1) read out the block information stored in each of the blocks of the nonvolatile memory, or the block information and the file management information, when the supply of power was turned on by the power-on circuit, and (2) register the read-out block information, or the block information and the file management information, in the volatile memory as file position information; read out a series of actual data of a file associated with the file management information stored in the nonvolatile memory, by referring to the file position information registered in the volatile memory; and write the file management information, which is stored in a first file management information area of a certain block of the nonvolatile memory, in a second file management information area set in the certain block, in such a manner that the file management information is updated.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a view illustrating an area allocation state of the file management information F in the sector $(n)12_n$ of the flash memory 12.

FIG. 6A is a view illustrating an updatable file management information area in the sector $(n)12_n$ in the flash memory 12.

FIG. 6B is a view for explaining a count state of the number of times of update by an update number management area R which is secured in the updatable file management information area in the sector $(n)12_n$ in the flash memory 12.

FIG. 7 is a flowchart illustrating an initialization process which is executed in accordance with a file management program of the electronic device 10.

FIG. 8 is a flowchart illustrating a FAT information forming process which is involved in the initialization process of the electronic device 10.

FIG. 9 is a flowchart illustrating a flash memory scan & data recovery process (scan disk process) which is involved in the initialization process of the electronic device 10.

DETAILED DESCRIPTION OF THE INVENTION

Embodiments of the present invention will be described hereinafter with reference to the accompanying drawings.

Figure 1:
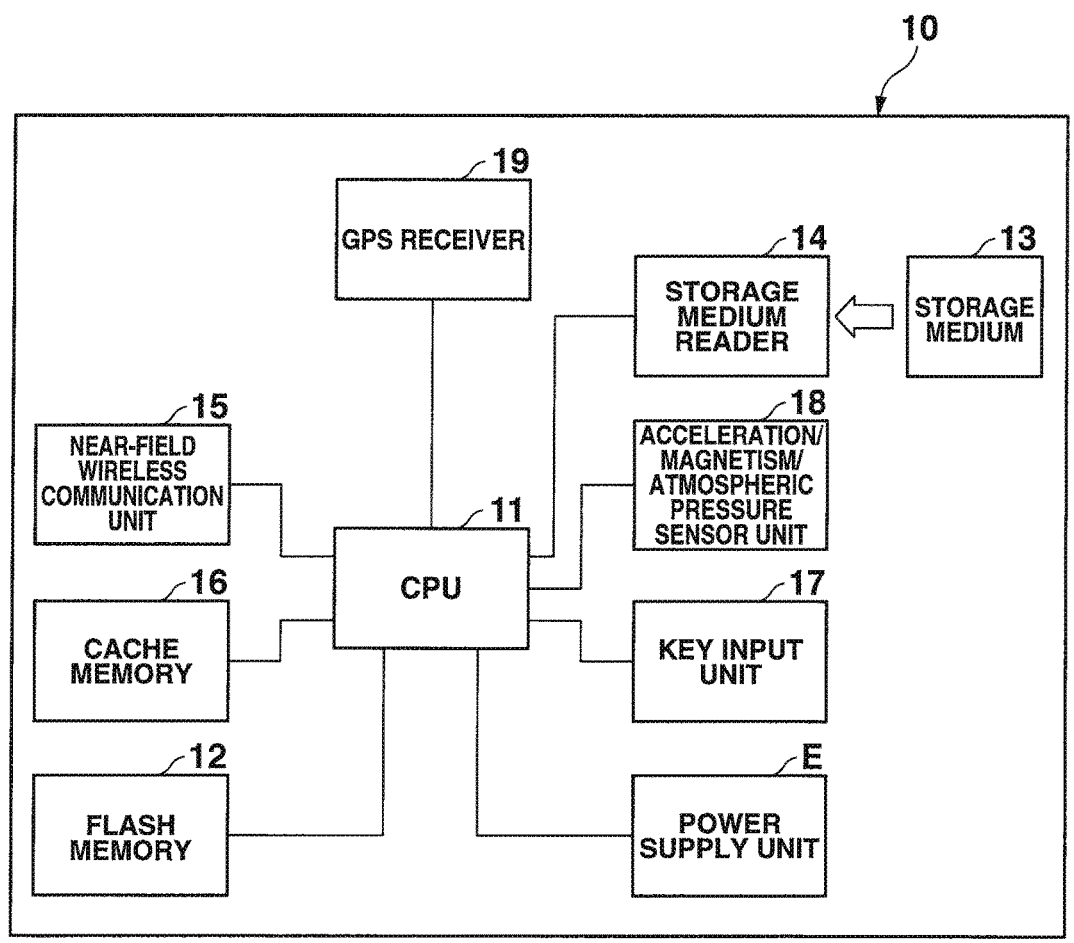
FIG. 1 is a block diagram illustrating a configuration of an electronic circuit of an electronic device 10 according to an embodiment of a data read apparatus of the present invention.

FIG. 1 is a block diagram illustrating a configuration of an electronic circuit of an electronic device 10 according to an embodiment of a data read apparatus of the present invention.

The electronic device 10 of this embodiment is utilized, for example, as a mobile terminal having a movement support function, or as a mobile terminal having a vehicle movement state recording function.

This electronic device 10 includes a CPU 11 that is a computer.

The CPU 11 controls operations of respective circuit components by using a cache memory 16, which is a volatile memory, as a working area, in accordance with a control program which is prestored in a flash memory 12 that is a nonvolatile memory, or a control program which has been read from an external storage medium 13, such as a memory card, by a storage medium reader 14, and stored in the flash memory 12, or a control program which has been downloaded from a program server on a communication network that is externally connected via a near-field wireless communication unit 15, and stored in the flash memory 12.

In the meantime, when the electronic device 10 of this embodiment is used, for example, as the mobile terminal having the above-described movement support function, various file data registered in the flash memory 12 is transferred at a proper timing to a PC possessed by, for example, a user, which is connected via the near-field wireless communication unit 15, in accordance with the movement support function, and the file data are utilized. Thus, the storage capacity of the flash memory 12 may be much smaller than the capacity of the memory mounted in the PC, and the number of sectors may be about 2000.

In addition, the cache memory 16 operates at a much higher speed and with a much lower power consumption than the flash memory 12.

The control program, which is stored in the flash memory 12, is started in response to a power supply signal from a rechargeable battery power supply unit E, a key input signal from a key input unit 17, each of sensor signals from a sensor unit 18 including an acceleration sensor, a magnetic sensor and an atmospheric pressure sensor, or a reception signal of satellite radio waves from a GPS receiver 19.

The above-described control programs include a file management program whose objects are the flash memory 12 and cache memory 16, as well as a system program which controls the operation of the entirety of the electronic device 10, and various application programs which control the movement support function.

Figure 2:
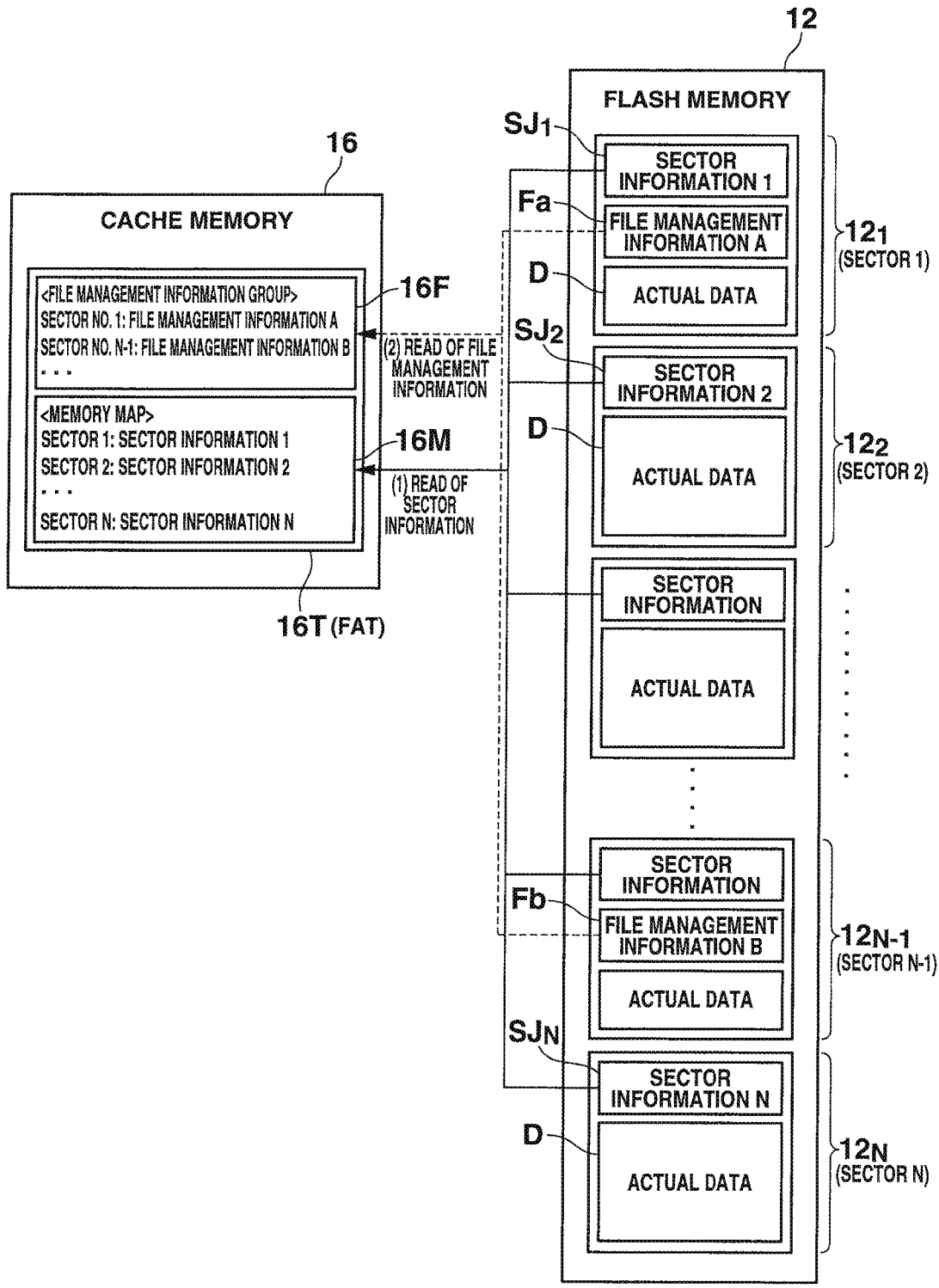
FIG. 2 is a view illustrating an area allocation state in a flash memory 12 and a cache memory 16 of the electronic device 10.

FIG. 2 is a view illustrating an area allocation state in the flash memory 12 and cache memory 16 of the electronic device 10.

The flash memory 12 stores actual data of one file such that the actual data is distributed to a plurality of sectors (blocks). Thus, the flash memory 12 includes an area storing management information, the area being configured to store and manage information (position, number) of a sector (block) which stores actual data of a beginning portion of a file, information (position, number) of a sector (block) which stores actual data of the next portion of the file, ..., and information (position, number) of a sector (block) which stores actual data of the last portion of the file.

The management information is created and updated, when necessary, in accordance with new creation, update, etc. of a file.

The flash memory 12 includes, for example, 2000 sectors (1)12$_1$, (2)12$_2$, . . . , (N)12$_N$. Sector information, SJ$_1$~SJ$_N$, is stored at a beginning portion of each sector, (1)12$_1$, (2)12$_2$, . . . , (N)12$_N$. In addition, in each of sectors (here, (1)12$_1$, (N−1)12$_{N-1}$) having first data of files stored in the flash memory 12, corresponding file management information (A)Fa, (A)Fb is stored next to the sector information SJ$_1$, SJ$_{N-1}$, and actual data D is stored after the file management information (A)Fa, (A)Fb.

Incidentally, actual data D of a sector 12$_n$ without the file management information F is stored next to the sector information SJ$_n$. The connection of the actual data D, which is stored in each sector, (1)12$_1$, (2)12$_2$, . . . , (N)12$_N$, is managed by "Next sector number" (see FIG. 3) which is written in the sector information SJ$_n$.

In the electronic device 10 of this embodiment, in order to make it possible to read the (actual) data D, which is stored in the flash memory 12, with high precision, at high speed and with low power consumption, a FAT information forming process (to be described later in detail) is executed as an initialization process at a time of power-on. In the FAT information forming process, the sector information SJ$_1$~SJ$_N$ and file management information (A)Fa, (B)Fb, which are stored in the respective sectors (1)12$_1$, (2)12$_2$, . . . , (N)12$_N$, are read out and stored in the cache memory 16, and a FAT (File Allocation Table) 16T is formed.

Thereby, when the CPU 11 reads out the data D of the flash memory 12, the CPU 11 can directly read the data D by acquiring the position of the necessary data D from the FAT 16T of the cache memory 16. It is thus possible to realize a much higher speed and a much lower power consumption than in the operation of reading the data D by acquiring the position of the data D from the FAT information of the flash memory 12.

Figure 3:
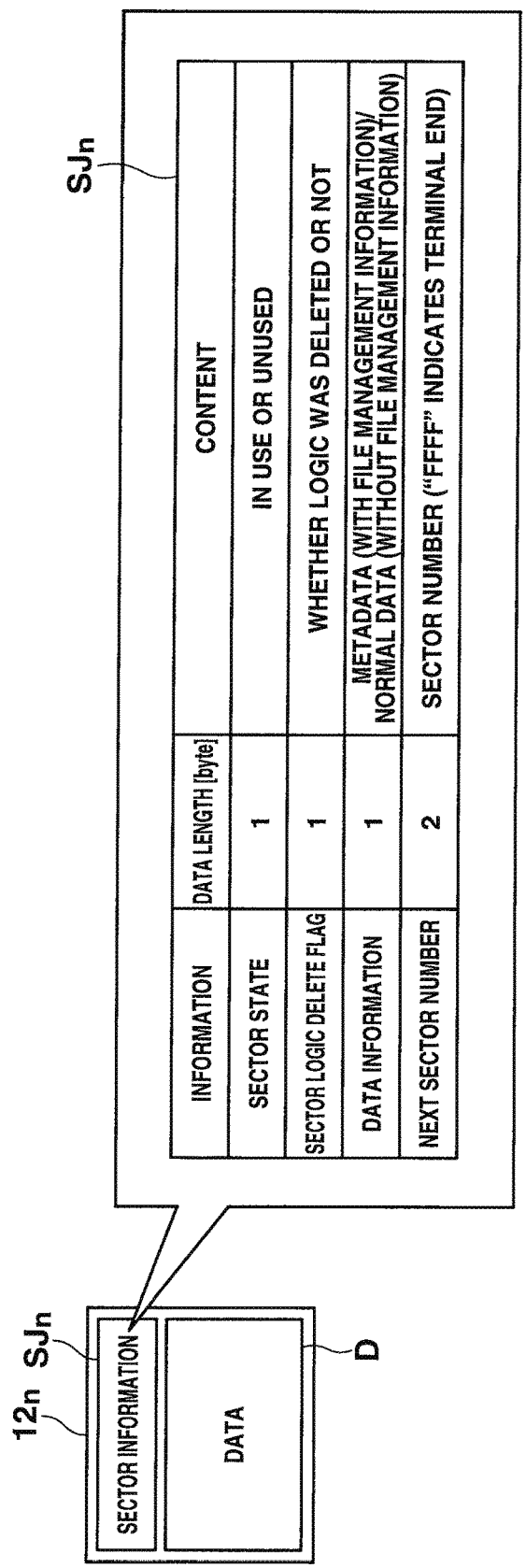
FIG. 3 is a view illustrating a configuration of sector information $SJ_n$ stored in each sector, $(1)12_1$, $(2)12_2$, ..., $(N)12_N$, of the flash memory 12.

FIG. 3 is a view illustrating a configuration of the sector information SJ$_n$ stored in each sector, (1)12$_1$, (2)12$_2$, . . . , (N)12$_N$, of the flash memory 12.

In this sector information SJ$_n$, the following pieces of information are stored: information "Sector state" indicating whether the corresponding sector (n)12$_n$ is in use or not; information [Sector logic delete flag] indicating whether delete of the corresponding sector (n)12$_n$ is designated or not; information [Data information] indicating whether the file management information F is stored in the corresponding sector (n)12$_n$ or not (whether the first data D of the file is stored or not); and information [Next sector number] indicating the sector number of a destination of storage of data D following the data D stored in the corresponding sector (n)12$_n$ ("FFFF" means that the data D of the corresponding sector (n)12$_n$ is at the end).

Figure 4:
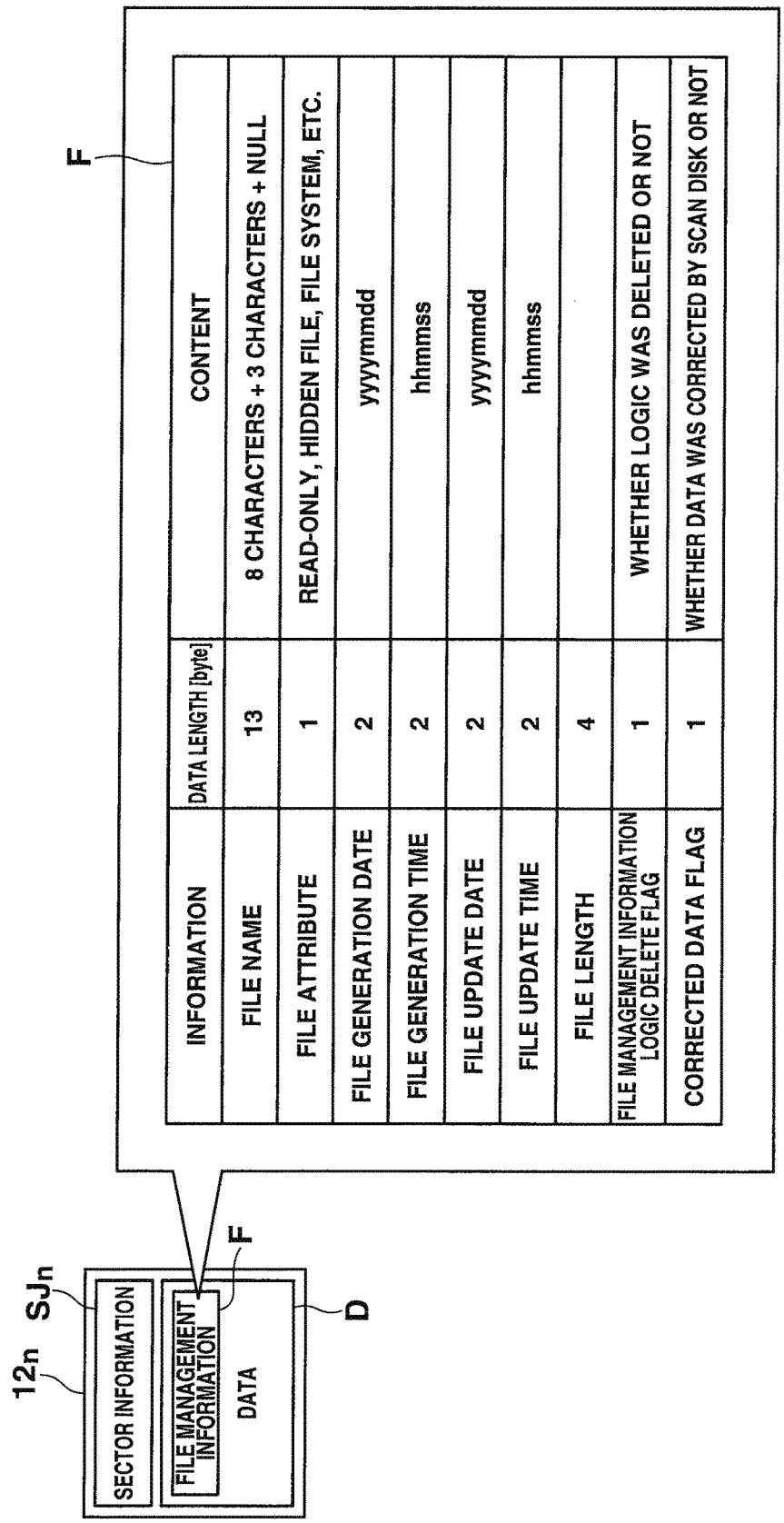
FIG. 4 is a view illustrating a configuration of file management information F stored in a sector $(n)12_n$, in which first data D of a file is stored, among the sectors $(1)12_1$, $(2)12_2$, ..., $(N)12_N$ of the flash memory 12.

FIG. 4 is a view illustrating a configuration of the file management information F stored in the sector (n)12$_n$, in which the first data D of the file is stored, among the sectors (1)12$_1$, (2)12$_2$, . . . , (N)12$_N$ of the flash memory 12.

Incidentally, in the case of this sector (n)12$_n$, the [Data information], which is written in the sector information SJ$_n$, is metadata indicating the presence of the beginning of the file.

In the file management information F, the following are written: [File name], [File attribute], [File generation date/time], [File update date/time] and [File length] of the corresponding file; information [File management information logic delete flag] indicating whether delete of the corresponding file is designated or not; and information [Corrected data flag] indicating whether the present data is the data which was corrected by a memory scan & data recovery process.

FIG. 5 is a view illustrating an area allocation state of the file management information F in the sector (n)12$_n$ of the flash memory 12.

The storage area of the file management information F is set as an updatable file management information area, which is secured next to the sector information SJ$_n$ in a first sector block (small: 4 KB) 12ns within one sector (n)12$_n$ that is set as a sector block (large: 64 KB).

This updatable file management information area is divided into a predetermined number (72 in this example) of file management information areas (1)f$_1$~(N)f$_N$, and an update number management area R which manages the number of times of update of write of the file management information F to the file management information areas (1)f$_1$~(N)f$_N$.

At a time of writing a new file, the file management information F is written in the file management information areas (1)f$_1$. Thereafter, each time rewrite (update) of the file occurs, the file management information F after the update is successively written and managed in the subsequent file management information areas (2)f$_2$~(N)f$_N$. It is thus possible to determine which file management information areas (n)f$_n$, among the sequentially ordered file management information areas, is currently being used, based on the number of times of update which is managed in the update number management area R.

FIG. 6A is a view illustrating the updatable file management information area in the sector (n)12$_n$ in the flash memory 12.

FIG. 6B is a view for explaining a count state of the number of times of update by the update number management area R which is secured in the updatable file management information area in the sector (n)12$_n$ in the flash memory 12.

In this update number management area R, the number of times of update is counted in a hexadecimal system, each time update write of the file management information F is executed with respect to the 72 file management information areas (1)f$_1$~(N)f$_N$ that are set as objects. For example, when the count value of the update number is "21" as shown in FIG. 6A, it can be determined that the current file management information F is written in the 22nd file management information area (22)f$_{22}$ (the file management information areas up to the 22nd file management information area (22)f$_{22}$ have already been used).

Incidentally, a description will be given later of the file management information update process in a case of updating the file management information F after the latest file management information F was written in the file management information area (N)f$_N$ and all the file management information areas (1)f$_1$~(N)f$_N$ of the updatable file management information area were used.

In the electronic device 10 with the above-described structure, the CPU 11 controls the operations of the respective circuit components in accordance with instructions described in the above-described control programs (including the system program, various application programs, and file management program), and the software and hardware cooperate to realize functions which will be described in the operational description below.

Next, a file management operation of the electronic device 10 with the above configuration is described.

(Initialization Process)

FIG. 7 is a flowchart illustrating an initialization process which is executed in accordance with the file management program of the electronic device 10.

FIG. 8 is a flowchart illustrating a FAT information forming process which is involved in the initialization process of the electronic device 10.

FIG. 9 is a flowchart illustrating a flash memory scan & data recovery process (scan disk process) which is involved in the initialization process of the electronic device 10.

This initialization process is executed at a time of power-on or at a time of reset due to occurrence of a fault. At first, the above-described FAT information forming process (step SA) is executed, and then the above-described flash memory scan & data recovery process (scan disk process) (step SB) is executed.

In the FAT information forming process, as illustrated in FIG. 2, at first, the sector information $SJ_1 \sim SJ_N$, which is stored in each sector, $(1)12_1, (2)12_2, \ldots, (N)12_N$ of the flash memory 12, is read out by the CPU 11, and stored in a memory map area 16M of the FAT 16T that is secured in the cache memory 16 (step A1).

Then, the first sector information $SJ_1$ of the sector information $SJ_1 \sim SJ_N$ stored in the memory map 16M is designated (step A2), and the content of [Data information] written in the sector information $SJ_1$ is read out (step A3).

Then, it is determined whether the read-out data information of the sector information $SJ_1$ is metadata indicating that the file management information F is stored in the corresponding sector $12_1$ (step A4).

In this embodiment, since the data information of the first sector information $SJ_1$ is determined to be metadata (step A4 (Yes)), file management information Fa, which is stored in the corresponding sector $12_1$ of the flash memory 12, is read out, and is stored in a file management information group area 16F of the FAT 16T that is secured in the cache memory 16, such that the file management information Fa is associated with the sector number 1 of the sector $12_1$ (step A5).

Then, it is determined whether all sector information $SJ_1 \sim SJ_N$ of the sectors $(1)12_1, (2)12_2, \ldots, (N) 12_N$ has been checked or not (step A6).

Here, it is determined that all sector information $SJ_1 \sim SJ_N$ has not yet been checked (step A6 (No)), and the next sector information $SJ_2$ of the sector information $SJ_1 \sim SJ_N$ stored in the memory map area 16M is designated (step A7).

Then, like the above, when it is determined that the content of [Data information] of the designated sector information $SJ_n$ is the metadata (with file management information), the process of reading out the file management information F of the sector $12_n$ and storing the file management information F in the file management information group area 16F of the FAT 16T of the cache memory 16 is repeatedly executed up to the terminal-end sector information $SJ_n$ (step A3~A7).

If it is determined that all sector information $SJ_1 \sim SJ_N$ of the sectors $(1)12_1, (2)12_2, \ldots, (N) 12_N$ has been checked (step A6 (Yes)), the series of the FAT information forming process is finished, and a transition occurs to the state in which the FAT 16T of the flash memory 12 is formed in the cache memory 16.

Next, if a transition is made to the flash memory scan & data recovery process (scan disk process), the first file management information Fa in the file management information group area 16F of the FAT 16T, which is formed in the cache memory 16, is designated as a target of checking (step B1).

Then, it is determined whether no content is written in [File length] while content is written in [File name] of the designated file management information Fa, that is, whether the file management information Fa is file management information F (requiring data recovery) at a time when a fault such as power cut-off occurred during the previous file write operation and a power cut-off process failed (step B2).

If it is determined that content is present in [File name] of the file management information F designated as the target of checking, and that content is absent in [File length] (data recovery is necessary) (step B2 (Yes)), the sector information $SJ_n$ having the [data information] of the beginning of the file, which corresponds to the file management information F, is read out from the memory map area 16M of the FAT 16T (step B3).

Then, sector information $SJ_{n\text{-}end}$ at the end of the file (next sector number "FFFF") is specified in the order beginning with the sector information $SJ_n$ having the [Data information] of the beginning of the file in accordance with the [Next sector number] of the same sector information $SJ_n$ (step B4).

Subsequently, the position (not "0xFF" (=0)), at which data is written, is specified in the actual data $D_n$ of the sector $12_{n\text{-}end}$ in the flash memory 12, which corresponds to the sector information $SJ_{n\text{-}end}$ at the end of the file (step B5).

Then, the data size from the beginning of the data of the file to the specified position at which the data of the end of the file is written is calculated, and the corresponding file management information F (file generation date/time, file length, corrected data flag) is generated (step B6).

Following the above, the generated file management information F is written in an updated file management information area $(n+1)f_{n+1}$ in the updatable file management information area (see FIG. 5) of the sector $12_n$ of the beginning of the file, and the recovery of the corresponding file is completed (step B7).

Then, it is determined whether all file management information Fa, Fb, . . . , in the file management information group area 16F of the FAT 16T has been checked or not (step B8).

If it is determined that all file management information Fa, Fb, . . . has not yet been checked (step B8 (No)), the next file management information F of the file management information Fa, Fb, . . . , stored in the file management information group area 16F, is designated (step B9).

Then, like the above, if it is determined that the file name is present in the designated file management information F but the file length is absent and data recovery is necessary, the process of specifying the end of data of the corresponding file and recovering and updating the file management information F is repeatedly executed up to the last file management information Fend (step B2~B9).

If it is determined that all file management information Fa, Fb, . . . , in the file management information group area 16F of the FAT 16T has been checked (step B8 (Yes)), the series of the flash memory scan & data recovery process is finished, and the initialization process ends.

(File Write Process)

Figure 10:
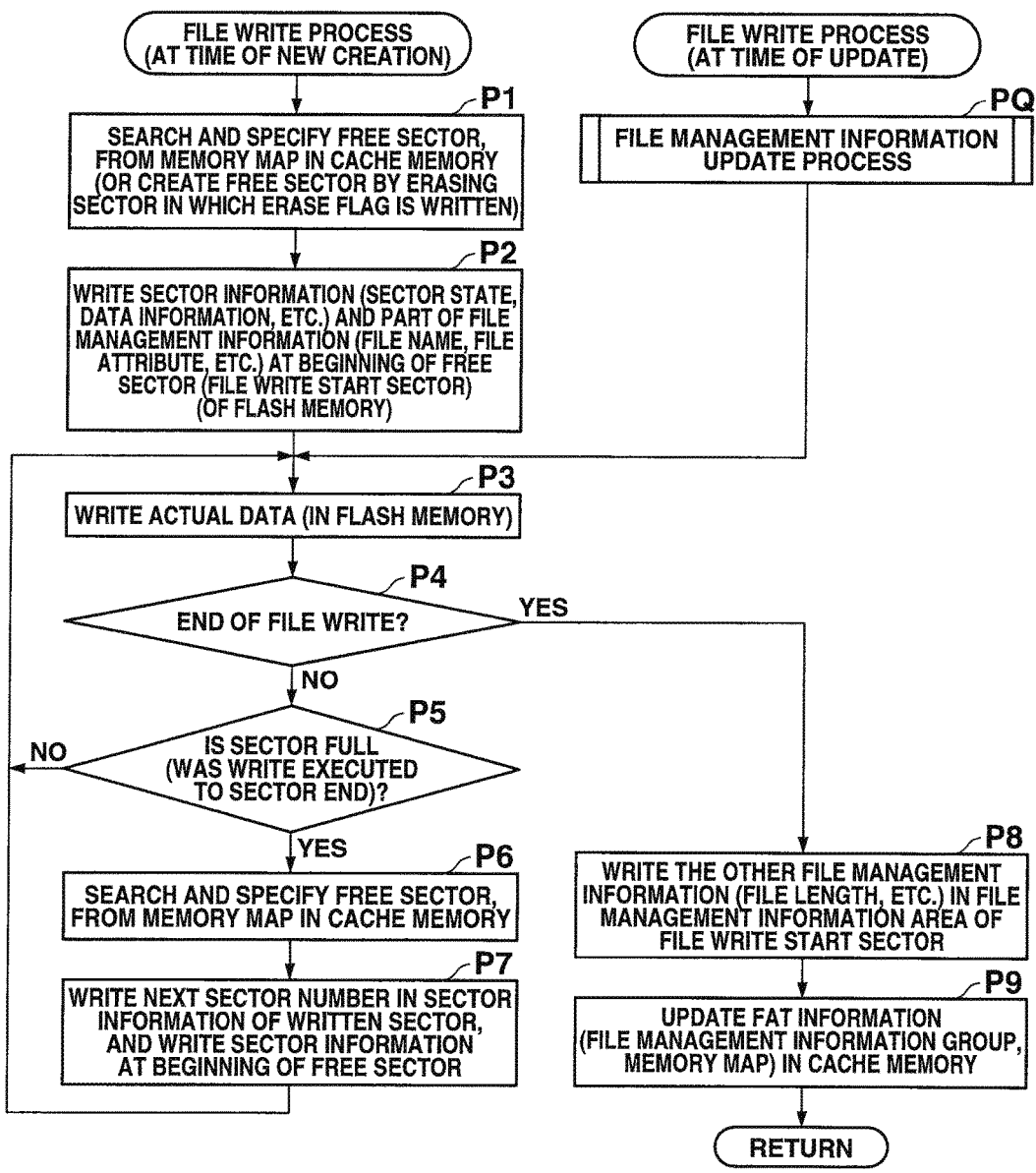
FIG. 10 is a flowchart illustrating a file write process (at time of new creation/at time of update) which is executed in accordance with the file management program of the electronic device 10.

FIG. 10 is a flowchart illustrating a file write process (at time of new creation/at time of update) which is executed in accordance with the file management program of the electronic device 10.

Figure 11:
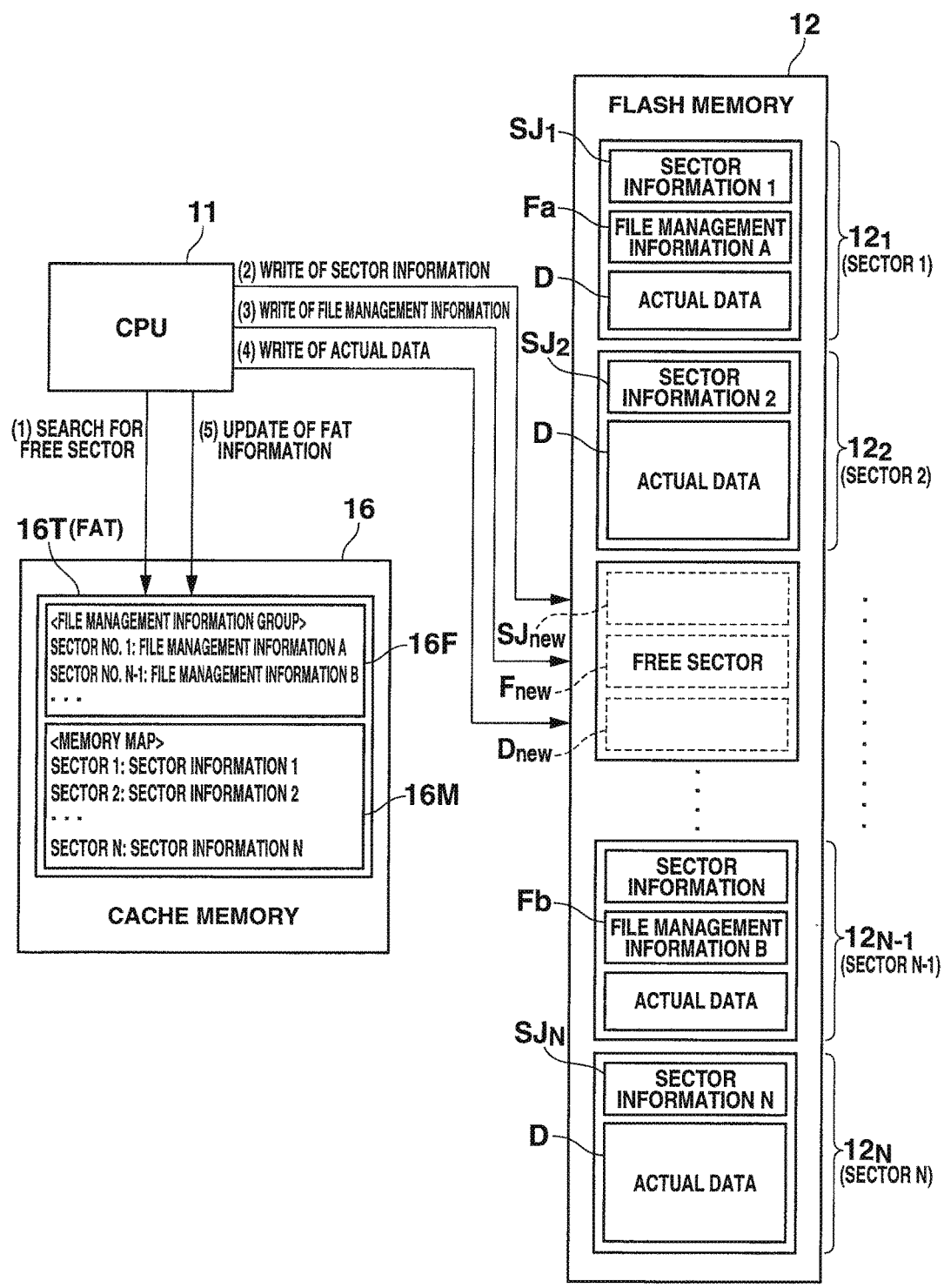
FIG. 11 is a view illustrating a control operation of the flash memory 12 and cache memory 16 by a CPU 11 according to the file write process (at time of new creation) of the electronic device 10.

FIG. 11 is a view illustrating a control operation of the flash memory 12 and cache memory 16 by the CPU 11 according to the file write process (at time of new creation) of the electronic device 10.

In a case where saving of a new file, which was generated according to various application programs, was instructed, if a file write process of the new file is started, a free sector $12_{new}$, whose [Sector state] is "unused", is specified based on each sector information $SJ_1 \sim SJ_N$, which is stored in the memory map area 16M of the FAT 16T of the cache memory 16 (step P1). In the meantime, the actual data D of a sector $12_n$, in which a flag is written in the [Sector logic delete flag] of the corresponding sector information $SJ_n$, may be deleted, and the sector $12_n$ may be set as a free sector $12_{new}$.

Then, at the beginning of the specified free sector (file write start sector) $12_{new}$ of the flash memory 12, sector information $SJ_{new}$ thereof and a part of file management information $F_{new}$ are written (step P2).

Subsequently, actual data $D_{new}$ of the generated new file is written in the free sector $12_{new}$ in which the sector information $SJ_{new}$ and file management information $F_{new}$ were written (step P3).

Here, before the end of write of the new file to the free sector $12_{new}$ is determined (step P4 (No)), if it is determined that the data write position of the free sector $12_{new}$ has reached the terminal end of the sector and there remains no free capacity (the sector is full) (step P5 (Yes)), the next free sector $12_{new2}$ is specified, like the above, based on each sector information $SJ_1 \sim SJ_N$, which is stored in the memory map area 16M of the FAT 16T of the cache memory 16 (step P6).

Then, the sector number of the next free sector $12_{new2}$ is written in the sector information $SJ_{new}$ of the sector $12_{new}$ having no free capacity, and sector information $SJ_{new2}$ of the next free sector $12_{new2}$ is written at the beginning of the next free sector $12_{new2}$ (step P7).

Thereafter, like the above, write of the new file to the flash memory 12 is repeated. If the end of write of the new file is determined (step P4 (Yes)), the other information, such as [File length], which is to be written in the file management information Fnew, is written in the file management information area $f_n$ (see FIG. 5) of the file write start sector $12_{new}$ in which the file management information $F_{new}$ was written in step P2 (step P8).

Then, the FAT 16T of the cache memory 16 is updated in accordance with the sector information $SJ_{new}$, $SJ_{new2}$, . . . , of the sectors $12_{new}$, $12_{new2}$, . . . , and the file management information $F_{new}$, which were generated in accordance with the write of the new file to the flash memory 12 (step P9).

Figure 12:
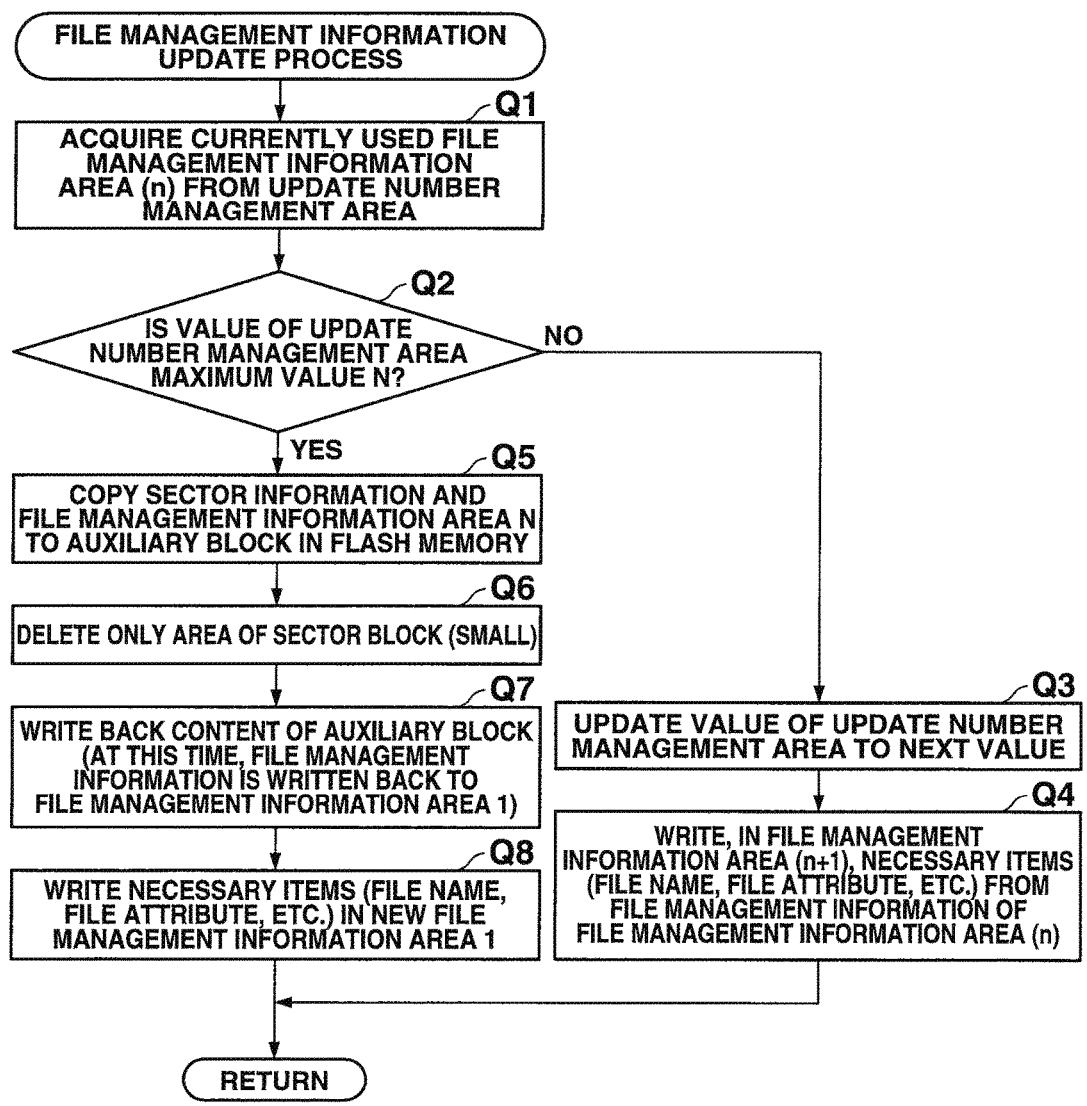
FIG. 12 is a flowchart illustrating a file management information update process which is involved in the file write process (at time of update) of the electronic device 10.

FIG. 12 is a flowchart illustrating a file management information update process which is involved in the file write process (at time of update) of the electronic device 10.

Figure 13A:
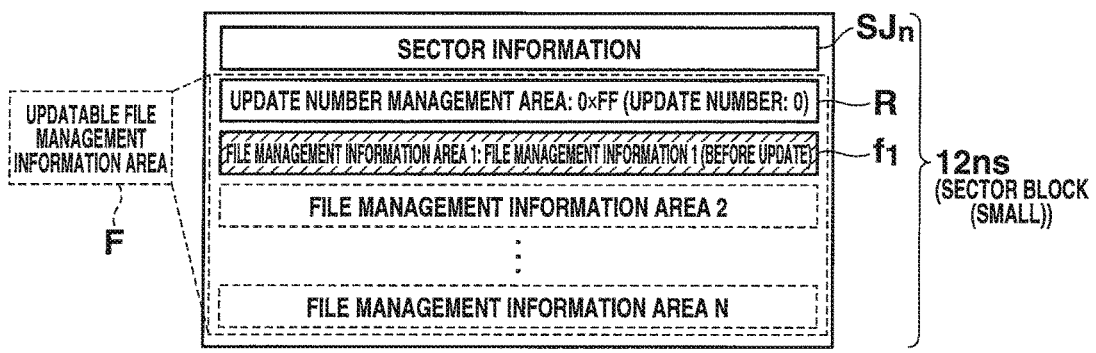
FIG. 13A, FIG. 13B and FIG. 13C are views for explaining an update operation (A~C) in the updatable file management information area of update-target file management information F according to the file write process (at time of update) of the electronic device 10.
Figure 13B:
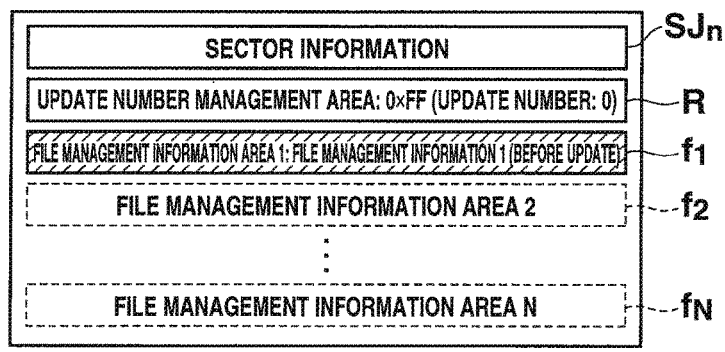
Figure 13C:
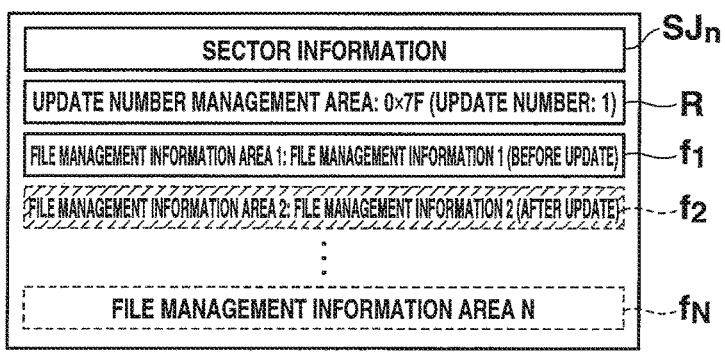

FIG. 13A, FIG. 13B and FIG. 13C are views for explaining an update operation in the updatable file management information area of update-target file management information F according to the file write process (at time of update) of the electronic device 10.

In a case where saving of a file, which was updated according to various application programs, was instructed, if a file write process of the updated file is started, a transition occurs to the file management information update process in FIG. 12 (step PQ).

In this file management information update process, to begin with, the value of the number of times of update, which indicates the currently used file management information area $(n)f_n$, is acquired from the update number management area R (see FIG. 5, FIG. 6) of the sector $12_n$ in which the file management information F of the update target of the flash memory 12 is stored (step Q1). Then, it is determined whether the number of times of update is equal to a maximum value N ("71" in this embodiment) (step Q2).

Here, for example, as illustrated in FIG. 13A and FIG. 13B, if the number of times of update of the update number management area R is "0" and the storage area of the currently used update-target file management information F is a file management information area $(1)f_1$ in the updatable file management information area and, thus, if it is determined that the maximum value N is not N(=71) (step Q2 (No)), the update number of the update number management area R is updated to "1" (step Q3).

Then, as illustrated in FIG. 13C, the information, such as [File name], [File attribute] and [File generation date/time], which is unchanged even after the update, among the pieces of file management information F stored in the pre-update file management information area $(1)f_1$, is read out and written, as post-update file management information, to a file management information area $(2)f_2$ corresponding to the update number "1" of the update number management area R (step Q4).

Then, according to the same write process (steps P3 to P7) of actual data D as described above, the updated actual data D is written in the sector $12_n$ as the first sector, in which the file management information F was updated this time.

Thereafter, if it is determined that the write of the actual data D of the updated file was finished (step P4 (Yes)), the other information, such as [File update date/time] and [File length], which is to be written in the file management information F, is written in the file management information area $(2)f_2$ (see FIG. 13C) in which the post-update file management information F was written in step Q4 (step P8).

Then, the FAT 16T of the cache memory 16 is updated in accordance with the sector information $SJ_n$, . . . , of the sectors $12_n$, . . . , and the file management information F, which were updated in accordance with the write of the updated file to the flash memory 12, (step P9).

On the other hand, in steps Q1 and Q2, if the number of times of update of the update number management area R is "71" and the storage area of the currently used update-target file management information F is a file management information area $(72)f_{72}$ at the terminal end in the updatable file management information area, and if it is determined that the update number is equal to the maximum value N (=71) (step Q2 (Yes)), the sector information $SJ_n$ of the sectors $12_n$ and the update-target file management information F of the file management information area $(72)f_{72}$ are copied to an auxiliary (saving) block in the flash memory 12 (step Q5).

Then, after the content of the sector block (small) 12ns, in which the sector information $SJ_n$ of the sector $12_n$ and the file management information F are stored, is deleted (step Q6), the sector information $SJ_n$ and update-target file management information F, which were saved in the auxiliary block of the file management information area $(72)f72$, are written back to the sector block (small) 12ns (step Q7). At this time, the update-target file management information F is written back to the file management information area $(1)f_1$.

Subsequently, the information, such as [File name], [File attribute] and [File generation date/time], which is unchanged even after the update, among the pieces of update-target file management information F, is written to the file management information area $(1)f_1$ as post-update file management information (step Q8).

Then, according to the same write process (steps P3 to P7) of actual data D as described above, the actual data D after the update is written in the sector $12_n$ as the first sector, in which the file management information F was updated this time.

Thereafter, if it is determined that the write of the actual data D of the updated file was finished (step P4 (Yes)), the other information, such as [File update date/time] and [File length], which is to be written in the file management information F, is written in the file management information area $(1)f_1$ in which the post-update file management information F was written in step Q8 (step P8).

Then, the FAT 16T of the cache memory 16 is updated in accordance with the sector information $SJ_n$, . . . , of the sectors $12_n$, . . . , and the file management information F, which were updated in accordance with the write of the update file to the flash memory 12, (step P9).

In the meantime, at a time of updating the file management information F after all file management information areas $(1)f_1 \sim (N)f_N$ of the updatable file management information area of the sector block (small) $12ns$ were used, the auxiliary block, which was prepared as a destination of saving of the sector information $SJ_n$ of the sector $12_n$ and the update-target file management information F existing in the terminal-end file management information area $(N)f_N$, may not be prepared at a fixed address in the flash memory 12. Alternatively, a sector $12_n$, whose [Sector state] written in the sector information $SJ_n$ is "unused", may be determined and used for the auxiliary block (see FIG. 14).

Figure 14:
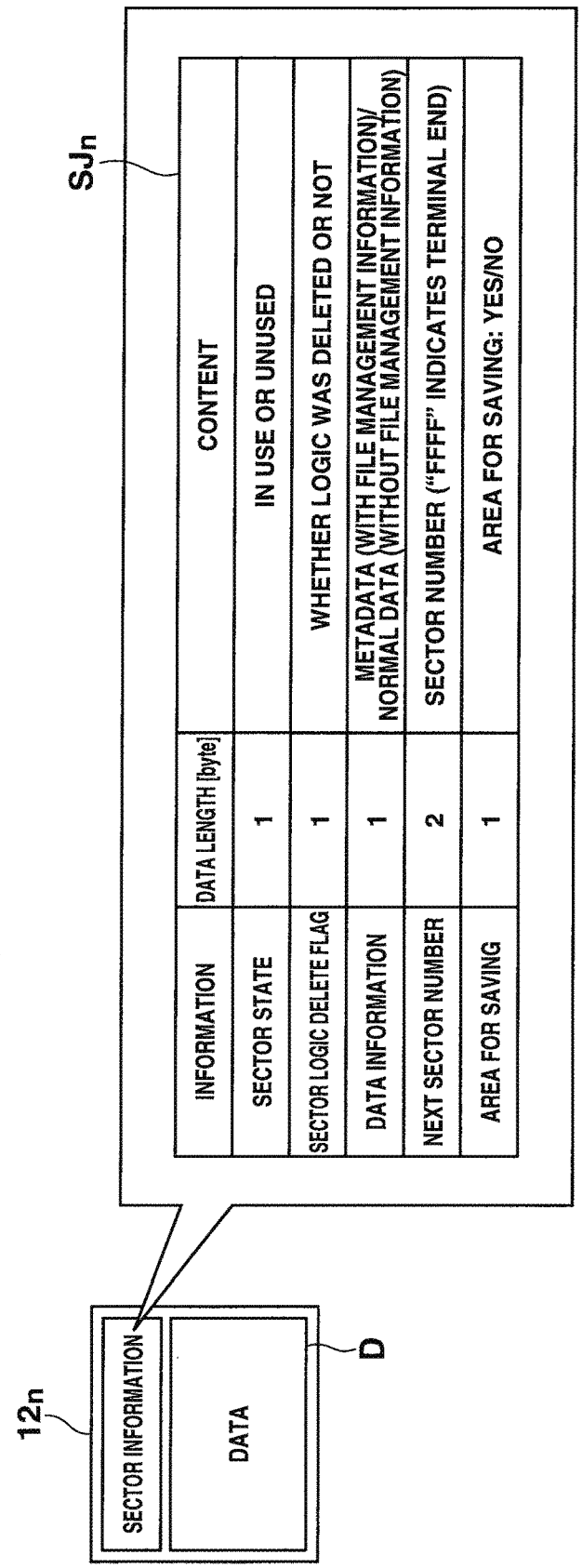
FIG. 14 is a view illustrating sector information $SJ_n$ of another sector $12_n$ which is used as a destination of saving of the sector information $SJ_n$ and file management information F in the sector block (small) $12ns$ of the flash memory 12.

FIG. 14 is a view illustrating sector information $SJ_n$ of another sector $12_n$ which is used as a destination of saving of the sector information $SJ_n$ and file management information F in the sector block (small) $12ns$ of the flash memory 12.

Specifically, in the sector information $SJ_n$ of another sector $12_n$ which is used as a destination of saving of the sector information $SJ_n$ and file management information F, information indicating whether this sector $12_n$ is an area for saving or not is written. Thereby, this sector $12_n$ is made usable.

(File Delete Process)

Figure 15:
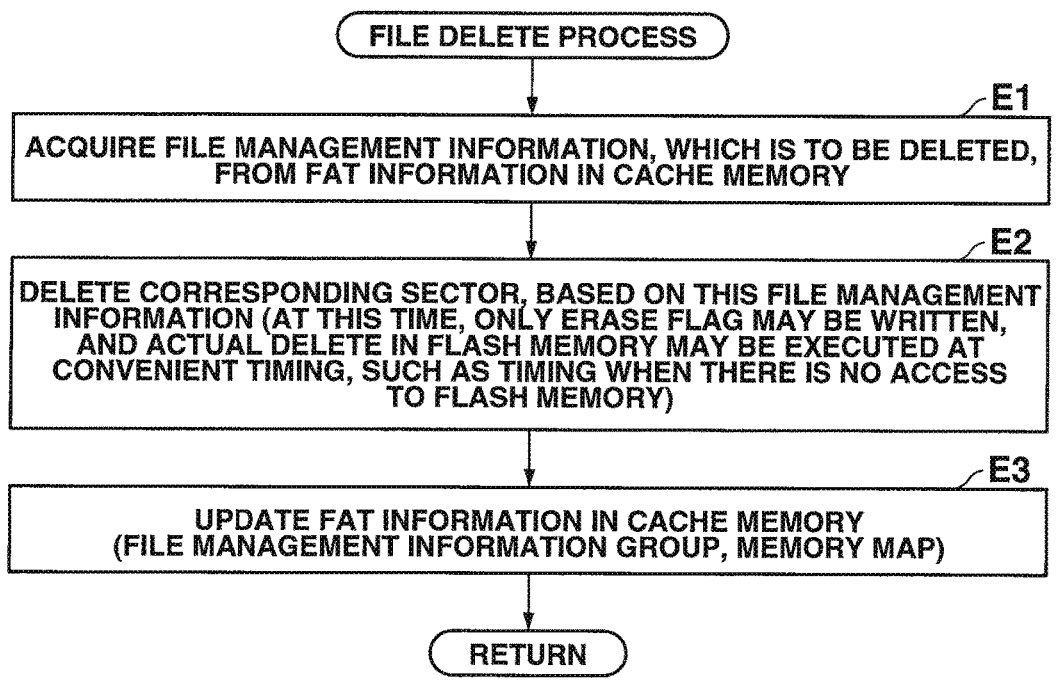
FIG. 15 is a flowchart illustrating a file delete process which is executed in accordance with the file management program of the electronic device 10.

FIG. 15 is a flowchart illustrating a file delete process which is executed in accordance with the file management program of the electronic device 10.

Figure 16:
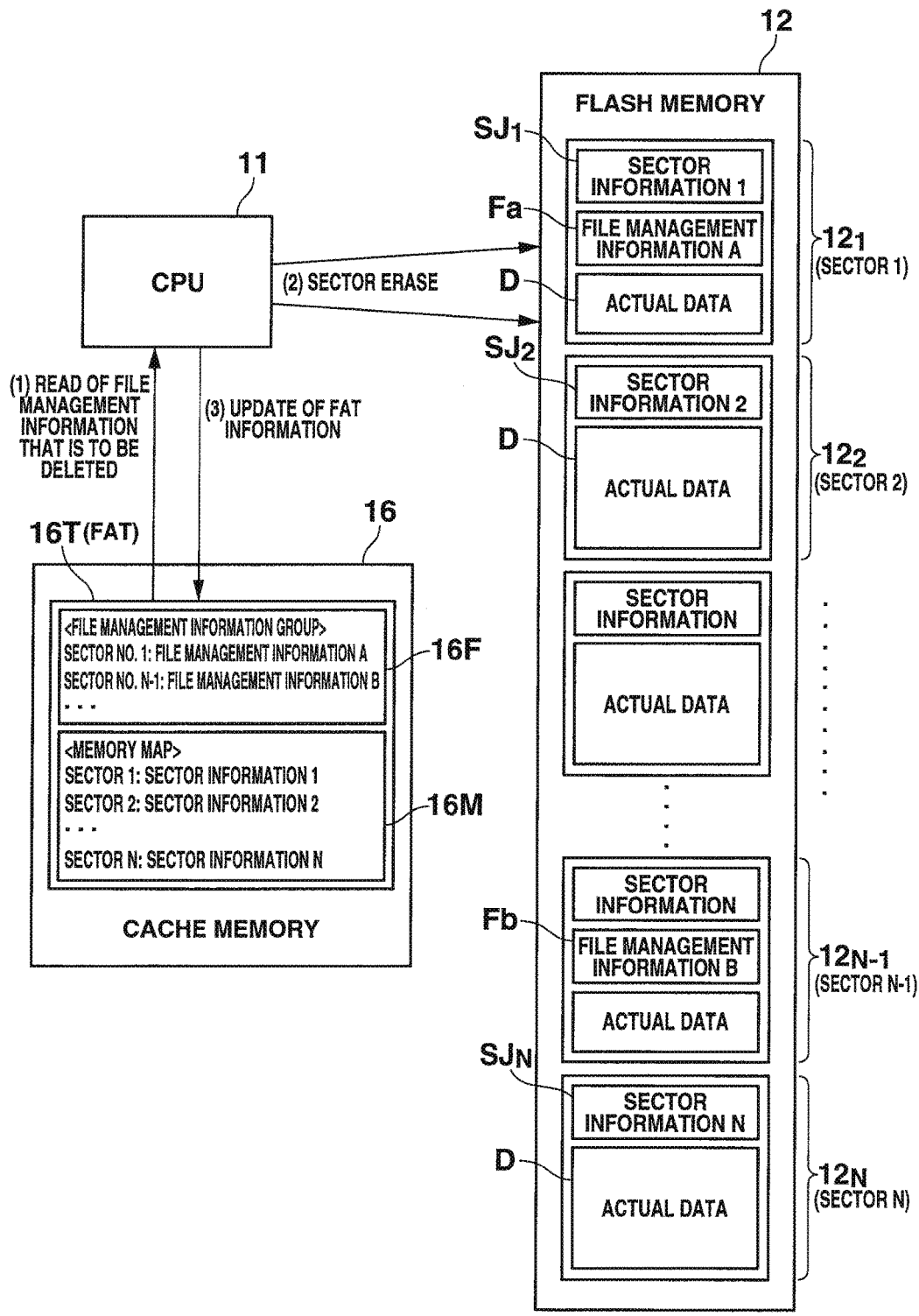
FIG. 16 is a view illustrating a control operation of the flash memory 12 and cache memory 16 by the CPU 11 according to the file delete process of the electronic device 10.

FIG. 16 is a view illustrating a control operation of the flash memory 12 and cache memory 16 by the CPU 11 according to the file delete process of the electronic device 10.

In a case where delete of a file was instructed in response to a user operation according to various application programs, if the file delete process is started, file management information F of a delete target is read out of the file management information group area 16F in the FAT 16T of the cache memory 16 (step E1).

Then, based on the delete-target file management information F which was read out of the file management information group area 16F, the content of the sector $12_n$ of the flash memory 12, in which the corresponding file is stored, is deleted. At this time, a flag indicating that a logic was already deleted, is written in the [Sector logic delete flag] of the sector information $SJ_n$ of the delete-target sector $12_n$. Thereby, the content of the sector $12n$ is treated, in the control, as having being deleted, and the actual data delete process may be executed at a timing with a light load in control, such as a timing when there is no access to the flash memory 12 (step E2).

Then, the FAT 16T of the cache memory 16 is updated in accordance with the sector information $SJ_n$ and file management information F of the sector $12_n$, which were updated in accordance with the file delete of the flash memory 12 (step E3).

(Rename Process)

Figure 17:
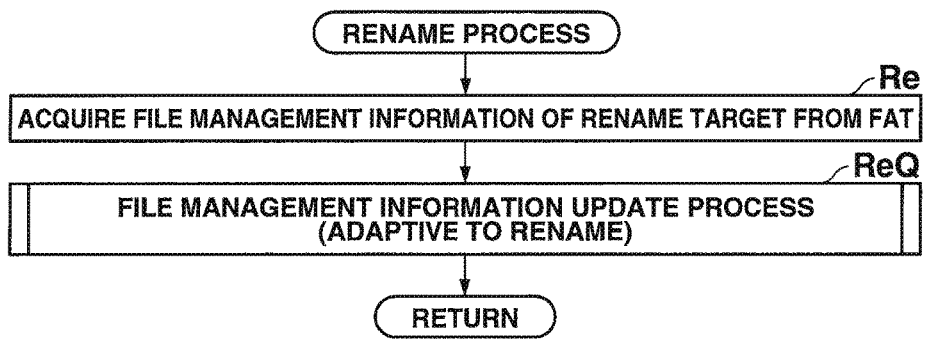
FIG. 17 is a flowchart illustrating a file rename process which is executed in accordance with the file management program of the electronic device 10.

FIG. 17 is a flowchart illustrating a file rename process which is executed in accordance with the file management program of the electronic device 10.

In a case where a change of a file name was instructed in response to a user operation according to various application programs, if the file rename process is started, file management information F of a change target is read out of the file management information group area 16F in the FAT 16T of the cache memory 16 (step Re).

Then, based on the change-target file management information F which was read out of the FAT 16T, only the [File name] thereof is changed and the file management information F is updated by executing the same file management information update process as described with reference to FIG. 12 (step ReQ).

(File Read Process)

Figure 18:
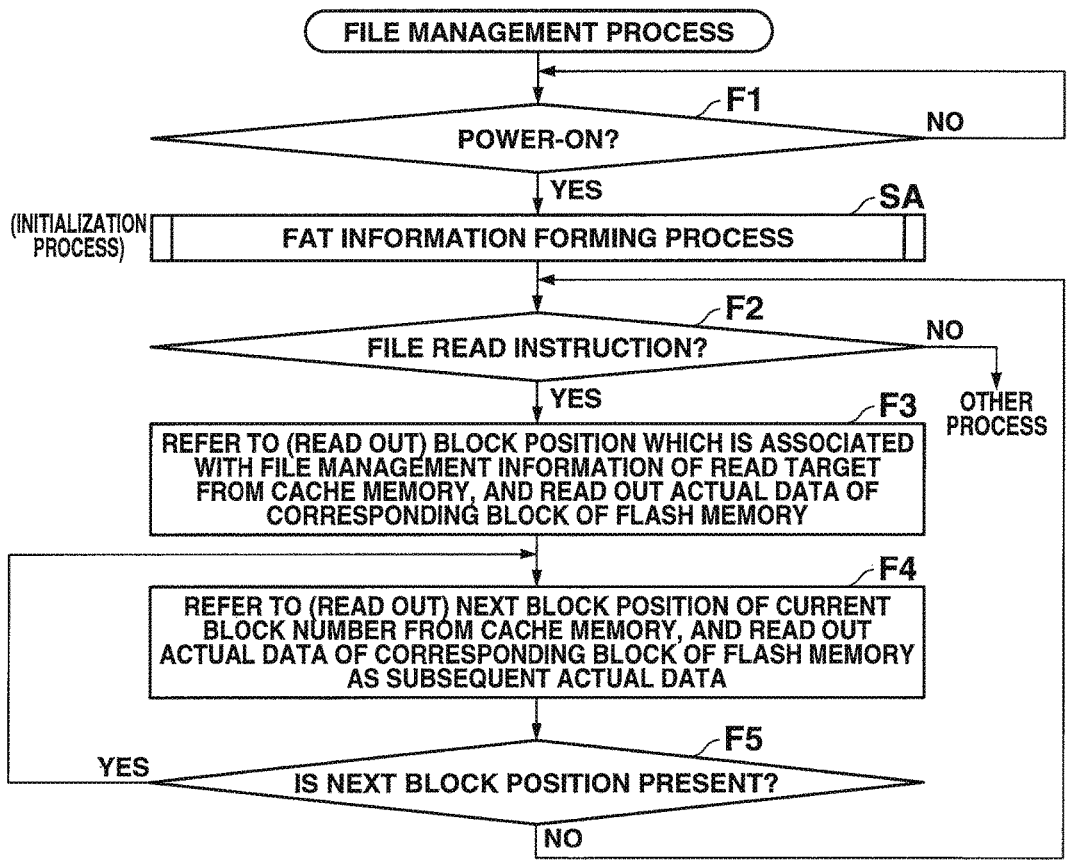
FIG. 18 is a flowchart illustrating a file management process (entire process) which is executed in accordance with the file management program of the electronic device 10.

FIG. 18 is a flowchart illustrating a file management process (entire process) which is executed in accordance with the file management program of the electronic device 10. In this file management process (FIG. 18), if power-on is detected (step F1), the FAT information forming process (step SA, FIG. 8) is executed as the initialization process, and the sector information and file management information of the flash memory 12 are read out and cached (registered) in the cache memory 16 as the memory map 16M and file management information group 16F. Incidentally, as the initialization process, as illustrated in FIG. 7, the FAT information forming process (step SA, FIG. 8) and, furthermore, the flash memory data recovery process (step SB of FIG. 7, and FIG. 9) may be executed.

Here, if the file read process is instructed (step F2; Yes), the first sector number (block position), which is associated with the file management information of the read target in the file management information group 16F of the cache memory 16, is referred to (read out), and the actual data of the corresponding sector number (corresponding block) stored in the flash memory 12 is read out (step F3).

Subsequently, the next sector number (block position) of the current sector number (block number) of the memory map 16M of the cache memory 16 is referred to (read out), and the actual data of the corresponding sector number (corresponding block) stored in the flash memory 12 is read out (step F4).

Then, it is determined whether or not there exists the next sector number (block position) of the current sector number (block number) of the memory map 16M of the cache memory 16 (step F5). If the next sector number (block position) exits (step F5; Yes), the process goes to step F4 and the subsequent actual data is read out. On the other hand, if there is no next sector number (block position) (step F5; No), the series of actual data thus far is saved as file actual data, and the read is completed.

In the meantime, in step F2, if the file read process is not instructed (step F2; No), the above-described file write process (FIG. 10), file delete process (FIG. 15) or rename process (FIG. 17) will be executed.

As described above, when read of any one of files was instructed with respect to the files of the flash memory 12 which are managed by the above-described initialization process, file write process, file delete process and file rename process, the position of the actual data D in the flash memory 12 is specified and the data D is read out, based on the file management information F of the read-target file, which is stored in the FAT 16T of the cache memory 16, and the sector information $SJ_n$ corresponding to this file management information F.

Thus, according to the file management function of the flash memory 12 in the electronic device 10 with the above-described configuration, the sector information $SJ_1 \sim SJ_N$, which is stored in each sector, $(1)12_1 \sim (N)12_N$, of the flash memory 12, and the file management information F, which is stored in each sector $(n)12_n, \ldots$, in which the first data of the file is stored, are read out by the initialization process that is executed upon power-on, and are stored in the FAT 16T of the cache memory 16 which operates at a higher speed and with a lower power consumption than the flash memory 12. Then, based on the file management information F and sector information $SJ_n$ which are stored in the FAT 16T of the cache memory 16, the position of the actual data D, ..., of the read-target file, which is stored in the flash memory 16, is specified and the data read is executed.

Thereby, since the position of the actual data D of the read-target file, which is stored in the flash memory 16, can directly be designated and the read of this data can be executed, data read can be executed at high speed and with low power consumption. In the meantime, even when unexpected power cut-off occurred during the operation of the electronic device 10 and the FAT 16T of the cache memory 16 was lost, the FAT 16T can easily be generated once again, based on each sector information, $SJ_1 \sim SJ_N$, and file management information F in the flash memory 16.

Additionally, according to the file management function of the flash memory 12 in the electronic device 10 with the above-described configuration, in accordance with the initialization process, the sector information $SJ_1 \sim SJ_N$, which is stored in each sector, $(1)12_1 \sim (N)12_N$, of the flash memory 12, is stored in the memory map area 16M in the FAT 16T of the cache memory 16, and the file management information F, which is stored in each sector, $12_n, \ldots$, in which the first data of the file is stored, is stored in the file management information group area 16F in the FAT 16T, with the file management information F being associated with the sector number. Then, the storage position in the flash memory 12 of the actual data D, ..., of the read-target file is specified based on the next sector number that is written in the sector information $SJ_n$ that is associated with the file management information F of the read-target file.

Additionally, according to the file management function of the flash memory 12 in the electronic device 10 with the above-described configuration, when a file is written in the flash memory 12, a free sector $12_n$ of the flash memory 12 is specified based on the sector information $SJ_n, \ldots$, which is stored in the FAT 16T of the cache memory 16, and actual data D, ..., of the write-target file is written. In addition, the sector information $SJ_n$, in which the data information indicative of the beginning of the file and the sector number of the destination of next data write are written, and the file management information F, are written in the sector (file write start sector) $12_n$ in which the first data D of the file was written. In a sector $12n$ corresponding to this next sector number, sector information $SJ_n$, in which the sector number of a further next data write destination is written, is written. Thereafter, the FAT 16T of the cache memory 16 is updated based on the sector information $SJ_n, \ldots$, and file management information F of the corresponding sector $12_n, \ldots$, in the flash memory 12 after the file write.

Additionally, according to the file management function of the flash memory 12 in the electronic device 10 with the above-described configuration, as regards the file management information F stored in the sector $12_n$, in which the first data D of the file of the flash memory 12 is written, each time the file is updated, the file management information F after the update is successively rewritten and updated in the file management information areas $(1)f_1 \sim (N)f_N$, into which the sector block (small) $12ns$ of the sector $12_n$ is divided.

In addition, since the number of times of update of the file is managed by counting the number of times of update in the update number management area R which is secured by dividing the sector block (small) $12ns$, it is possible to specify, based on this number of times of update, the file management information area $(n)f_n$ in which the current file management information F is written.

In addition, when the file is updated, if it is determined, based on the number of times of update that is managed in the update number management area R, that the current file management information F (before update) is written in the terminal-end file management information area $(N)f_N$ of the plural divided file management information areas $(1)f_1 \sim (N)f_N$, the file management information F (before update) is saved in another sector block. After the content of each file management information area $(1)f_1 \sim (N)f_N$ was deleted, the file management information F (before update) is written back to the first file management information area $(1)f_1$. Then, in accordance with the update of the file, the file management information F (before update), which was written back to the first file management information area $(1)f_1$, is updated to post-update file management information F.

The methods of the respective processes by the file management function of the electronic device 10 described in each of the embodiments, that is, the respective methods of the initialization process illustrated in the flowcharts of FIG. 7 to FIG. 9, the file write process (at time of new creation/at time of update) illustrated in the flowchart of FIG. 10, the file management information update process involved in the file write process (at time of update) illustrated in the flowchart of FIG. 12, the file delete process illustrated in the flowchart of FIG. 15, and the file rename process illustrated in the flowchart of FIG. 17, can all be stored as computer-executable programs in a medium of an external storage device (13), such as a memory card (ROM card, RAM card, etc.), a magnetic disk (floppy disk, hard disk, etc.), an optical disc (CD-ROM, DVD, etc.), or a semiconductor memory, and can be distributed. In addition, the computer (11) of the electronic device reads the program, which is stored in the medium (13) of the external storage device, into the storage device (12), and the operation is controlled by this read-in program. Thereby, it is possible to realize the file management function described in the embodiments, and to execute the same processes by the above-described methods.

Additionally, the electronic device 10 may be configured to include a CPU 11 that is a computer, a control program prestored in an internal memory, and a cache memory 16 that is a volatile memory, and to operate by being connected to an external flash memory 12 via a memory card slot or the like. In this case, the flash memory, which is nonvolatile storage means comprising a plurality of blocks, may be configured such that the flash memory is initially set when the flash memory is first used, and that an area storing block information, in which the position of the next block is written, or storing this block information and file management information, and an area storing actual data, are set in each of the blocks. In this case, by the file write process of the present invention, the block information (sector information) and file management information are set in the first write block (sector), and the block information (sector information) is written in a subsequent write block (sector), and is thus managed.

In addition, the data of the program for realizing each of the above-described methods can be transmitted on a communication network in the form of a program code, and the data of the program can be taken in the electronic device from a computer apparatus (program server) connected to this communication network, and stored in the storage device (12), thereby realizing the above-described file management function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data read apparatus comprising:
   a nonvolatile memory comprising a plurality of blocks, each of the blocks including an area storing block information, in which a position of a next block is written, and file management information, and an area storing actual data;
   a volatile memory;
   a power-on circuit configured to turn on supply of power to the nonvolatile memory and the volatile memory; and
   a processor,
   the processor being configured to:
   (1) read out the block information stored in each of the blocks of the nonvolatile memory, or the block information and the file management information, when the supply of power was turned on by the power-on circuit;
   (2) register the read-out block information, or the block information and the file management information, in the volatile memory as file position information;
   (3) read out a series of actual data of a file associated with the file management information stored in the nonvolatile memory, by referring to the file position information registered in the volatile memory;
   (4) successively write and manage, each time an update of the file management information occurs, the file management information after the update in a plurality of file management information areas that are sequentially ordered in a certain block of the nonvolatile memory to store the file management information;
   (5) count-up, when updating the file, so that a number of times that the file has been updated is stored in an update number management area that is set in the certain block of the non-volatile memory to store the number of times the file has been updated;
   (6) determine which file management information area is currently being used based on the number of times the file has been updated which is stored in the update number management area; and
   (7) read out a series of actual data associated with the file management information stored in the nonvolatile memory, by referring to the file position information registered in the volatile memory.

2. The data read apparatus of claim 1, wherein the file management information stored in the nonvolatile memory is stored in a block in which first actual data of a corresponding file is stored,
   a position of a next block is a block position at which actual data following first actual data is stored, and
   the processor is configured to:
   (1) read out, at a time of reading out the block information stored in each of the blocks of the nonvolatile memory, or the block information and the file management information, and registering the read-out block information, or the block information and the file management information, in the volatile memory as the file position information, the block information stored in each of the blocks of the nonvolatile memory, or the block information and the file management information, (2) store the block information in a first area of the volatile memory, and (3) store the file management information in a second area of the volatile memory in association with a block position at which the file management information was read out; and
   read out, at a time of reading out the series of actual data associated with the file management information from the nonvolatile memory, actual data of a corresponding block stored in the nonvolatile memory by referring to a block position associated with the file management information of the volatile memory of a read target, and read out actual data of a corresponding bock stored in the nonvolatile memory by referring to a next block position of the volatile memory which is next to the block position where the actual data was read out, thereby reading out the actual data as the series of actual data associated with the file management information.

3. The data read apparatus of claim 1, wherein the processor is configured to:
   write, in the block information stored in each of the blocks of the nonvolatile memory, information indicating whether a corresponding block is a free block or not;
   store, in accordance with the information indicating the free block in the block information stored in the volatile memory, actual data of a write target file in the corresponding block of the nonvolatile memory;
   write the block information and the file management information in the block of the nonvolatile memory in which the actual data of the write target file was stored; and
   update the file position information stored in the volatile memory, based on the block information and the file management information written in the block of the nonvolatile memory.

4. The data read apparatus of claim 1, wherein the processor is configured to:
   determine, when the file is updated, whether current file management information is written in a terminal-end file management information area of the plural set file management information areas, based on the number of times of update of the file, which was stored in the update number management area;
   (1) save the current file management information, which is stored in the terminal-end file management information area, in another block, when it was determined that the current file management information is written in the terminal-end file management information area of the plural set file management information areas, (2) and, after the file management information stored in each of the file management information areas was deleted, write back the saved current file management information to a first one of the file management information areas; and
   update, in accordance with update of the file, the current file management information which was written back to the first one of the management information areas.

5. A non-transitory computer readable storage medium having stored therein a program for controlling a processor of an electric device which includes a nonvolatile memory comprising a plurality of blocks, each of the blocks including an area storing block information, in which a position of a next block is written, and file management information, and an area storing actual data, a volatile memory, and a power-on circuit configured to turn on supply of power to the nonvolatile memory and the volatile memory, the program causing the processor to execute:
(1) read out the block information stored in each of the blocks of the nonvolatile memory, or the block information and the file management information, when the supply of power was turned on by the power-on circuit, and
(2) register the read-out block information, or the block information and the file management information, in the volatile memory as file position information;
(3) read out a series of actual data of a file associated with the file management information stored in the nonvolatile memory, by referring to the file position information registered in the volatile memory;
(4) successively write and manage, each time an update of the file occurs, the file management information after the update in of a plurality of file management information areas that are sequentially ordered in a certain block of the nonvolatile memory to store the file management information;
(5) count-up, when updating the file, so that a number of times that the file has been updated is stored in an update number management area that is set in the certain block of the non-volatile memory to store the number of times the file has been updated;
(6) determine which file management information area is currently being used based on the number of times the file has been updated which is stored in the update number management area; and
(7) read out a series of actual data associated with the file management information stored in the nonvolatile memory, by referring to the file position information registered in the volatile memory.

6. A data read method of an electric device which includes a nonvolatile memory comprising a plurality of blocks, each of the blocks including an area storing block information, in which a position of a next block is written, and file management information, and an area storing actual data, a volatile memory, and a power-on circuit configured to turn on supply of power to the nonvolatile memory and the volatile memory, the method comprising:
(1) reading out the block information stored in each of the blocks of the nonvolatile memory, or the block information and the file management information, when the supply of power was turned on by the power-on circuit, and
(2) registering the read-out block information, or the block information and the file management information, in the volatile memory as file position information;
(3) reading out a series of actual data of a file associated with the file management information stored in the nonvolatile memory, by referring to the file position information registered in the volatile memory;
(4) successively writing and managing, each time an update of the file occurs, the file management information after the update in of a plurality of file management information areas that are sequentially ordered in a certain block of the nonvolatile memory to store the file management information;
(5) counting-up, when updating the file, so that a number of times that the file has been updated is stored in an update number management area that is set in the certain block of the non-volatile memory to store the number of times the file has been updated;
(6) determining which file management information area is currently being used based on the number of times the file has been updated which is stored in the update number management area; and
(7) reading out a series of actual data associated with the file management information stored in the nonvolatile memory, by referring to the file position information registered in the volatile memory.

* * * * *